No. 705,178. Patented July 22, 1902.
C. H. WHEELER & F. W. KREMER.
SOLID RUBBER TIRE.
(Application filed Oct. 23, 1900.)
(No Model.)
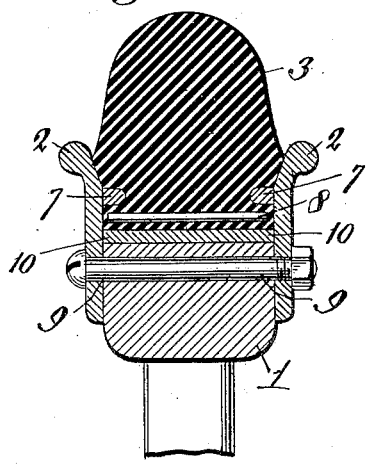
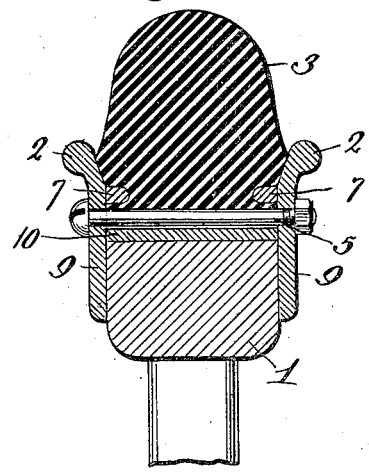
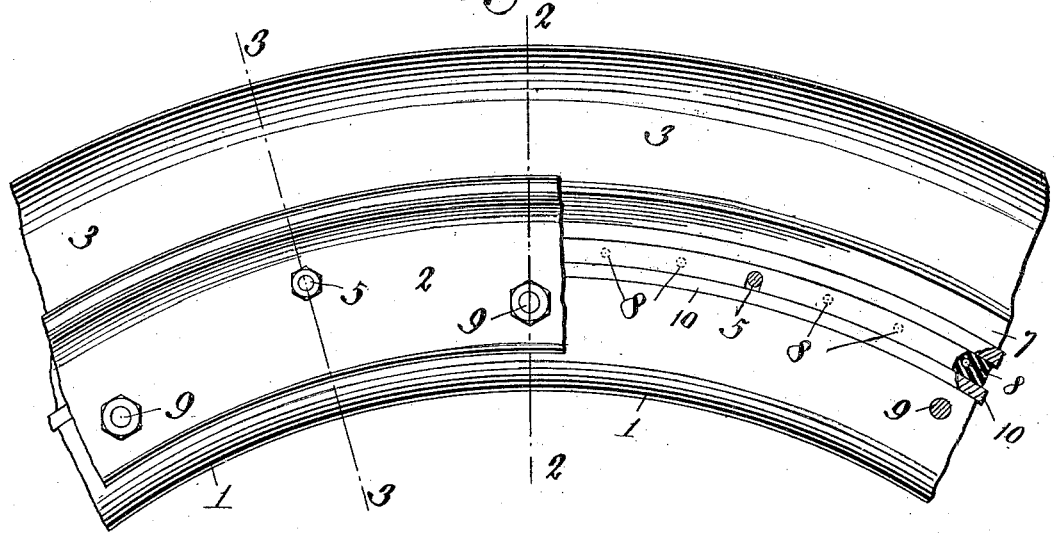
WITNESSES:
INVENTORS
Charles H. Wheeler
Frank W. Kremer
BY
Ernest Hopkinson
their ATTORNEY

UNITED STATES PATENT OFFICE.

CHARLES H. WHEELER AND FRANKLIN W. KREMER, OF AKRON, OHIO; SAID WHEELER ASSIGNOR TO THE INDIA RUBBER COMPANY, OF AKRON, OHIO, A CORPORATION OF OHIO.

SOLID RUBBER TIRE.

SPECIFICATION forming part of Letters Patent No. 705,178, dated July 22, 1902.

Application filed October 23, 1900. Serial No. 34,038. (No model.)

*To all whom it may concern:*

Be it known that we, CHARLES H. WHEELER, residing at No. 208 Silver street, and FRANKLIN W. KREMER, residing at No. 100 Rosedale Place, in the city of Akron, county of Summit, and State of Ohio, citizens of the United States, have invented a new and useful Improvement in Rubber Tires for Vehicles, of which the following is a specification.

The present invention relates to rubber-tires and vehicle wheels, and especially is designed to provide a construction in which the rubber tire may be vulcanized or otherwise formed into an annulus of the desired size to fit the wheel for which it is designed.

Another object of the invention is to provide easy means of securing the rubber tire to the wheel in such manner as to permit of ready disassociation for repairs.

Further, the object of the invention is to provide means for preventing the tire from creeping longitudinally.

Another object of the invention is to do away with the possibility of the sides of the tire being pushed out under wearing strain against the metallic side flanges. This is accomplished by making the sides of the rubber tire sloping toward the periphery at the central line and at the same time abruptly flaring outwardly the side flanges.

Again, an incidental feature of the invention is the shaping of the side flanges and the rubber tire in such manner that a portion of the direct downward strain is sustained by the side flanges upon which the rubber tire is partially seated.

In the drawings accompanying the present application we have illustrated a construction embodying the features of the present invention.

In said drawings like numerals of reference refer to like parts throughout the several views.

Figure 1 illustrates in side elevation a portion of a wheel embodying our invention, certain parts being broken away. Fig. 2 is a view in cross-section along line 2 2 of Fig. 1. Fig. 3 is a view in cross-section along line 3 3 of Fig. 1.

Referring to said drawings in detail, 1 designates the felly, and 2 the side flanges. The tire is designated by the numeral 3. It is molded and vulcanized to the size required. Preferably the tire will be made on the circumference of a circle slightly less than the wheel to which it is applied in order that when in position the tire may be under some tension, as distinguished from the usual method of applying solid tires—namely, by compressing the rubber. On its under surface the tire is provided with recesses or transverse openings 4, through which pass bolts or equivalent fastening devices 5. These bolts perform the double function of constituting a lug for preventing the creeping of the tire and at the same time operate to assist in securing the side flanges in position. On each side of the tire a circumferential groove or recess 6 is provided, in which is seated a shoulder or ring 7. This shoulder or ring may be made integral with the side flanges 2 or may be separate therefrom, as illustrated in the drawings. These rings pass just above the bolts 5 and serve to keep the tire in proper seating position. Passing transversely through the tire at intervals are rods 8, the ends of which project immediately under the shoulders or rings 7. These transverse rods prevent the tire from being displaced or turned out of position by lateral strains. Bolts 9 are provided for further securing the side flanges 2 in position. These bolts pass through the felly of the wheel.

10 designates the usual metal rim of the wheel.

From the foregoing description it will be seen that it is exceedingly easy to place the tire in position and disassociate the parts for repairs and that no special machinery is required for the purpose; further, that the whole body of the tire is composed of rubber, and therefore has an increased resilience over constructions in which the core of the tire is taken up with means for securing the tire to the rim. Also it will be seen that the construction is one which may be easily applied to ordinary vehicle-wheels.

What we claim as new is—

1. In a vehicle-wheel, a rubber tire in the form of an annulus, a rim, side flanges projecting beyond the periphery of the rim to form a tire-channel, one or more binding-rings located in the tire above the base thereof, an outer and an inner series of bolts, the outer series passing through the side flanges and the base of the tire immediately above the rim and below the binding-rings and the inner series passing through the flanges and the rim.

2. In a vehicle-wheel, a rubber tire in the form of an annulus, a rim, side flanges projecting beyond the periphery of the rim to form a tire-channel, binding-rings located in the tire above the base thereof, one on each side, transverse rods located in the tire below said rings, and two series of bolts, the outer series passing through the side flanges and the base of the tire immediately above the rim and below the binding-rings, and the inner series passing through the flanges and the rim, substantially as specified.

3. In a vehicle-wheel, a rubber tire in the form of an annulus, a rim, separable side flanges projecting beyond the periphery of the rim to form the tire-channel, and having divergent outer edges, and an outer and inner series of bolts, the outer series passing through the side flanges and the base of the rubber tire immediately above the rim of the wheel, and the inner series passing through the flanges and the rim, substantially as described.

4. In a vehicle-wheel, a rim, a rubber tire broader at the base than at the tread, and having sides inclined to the tread, said tire being in the form of an annulus, separable side flanges projecting beyond the rim to form the tire-channel and having divergent outer edges, and an outer and inner series of bolts, the outer series passing through the side flanges and the base of the rubber tire immediately above the rim of the wheel and the inner series passing through the flanges and the rim, substantially as described.

5. In a vehicle-wheel, a rubber tire in the form of an annulus, a rim, side flanges projecting beyond the periphery of the rim to form a tire-channel, means for binding the base of the tire down on the rim, and an outer and inner series of bolts, the outer series passing through the side flanges and the base of the rubber tire below the binding means, and the inner series passing through the flanges and the rim, substantially as described.

In witness whereof we have hereunto set our hands in the presence of two subscribing witnesses.

CHARLES H. WHEELER.
FRANKLIN W. KREMER.

Witnesses:
A. L. DICKINSON,
C. W. HOSFIELD.